Nov. 19, 1963 A. F. HICKMAN 3,111,335
VEHICLE SPRING SUSPENSION FOR REAR DRIVE AXLE
Filed Feb. 23, 1961 5 Sheets-Sheet 4
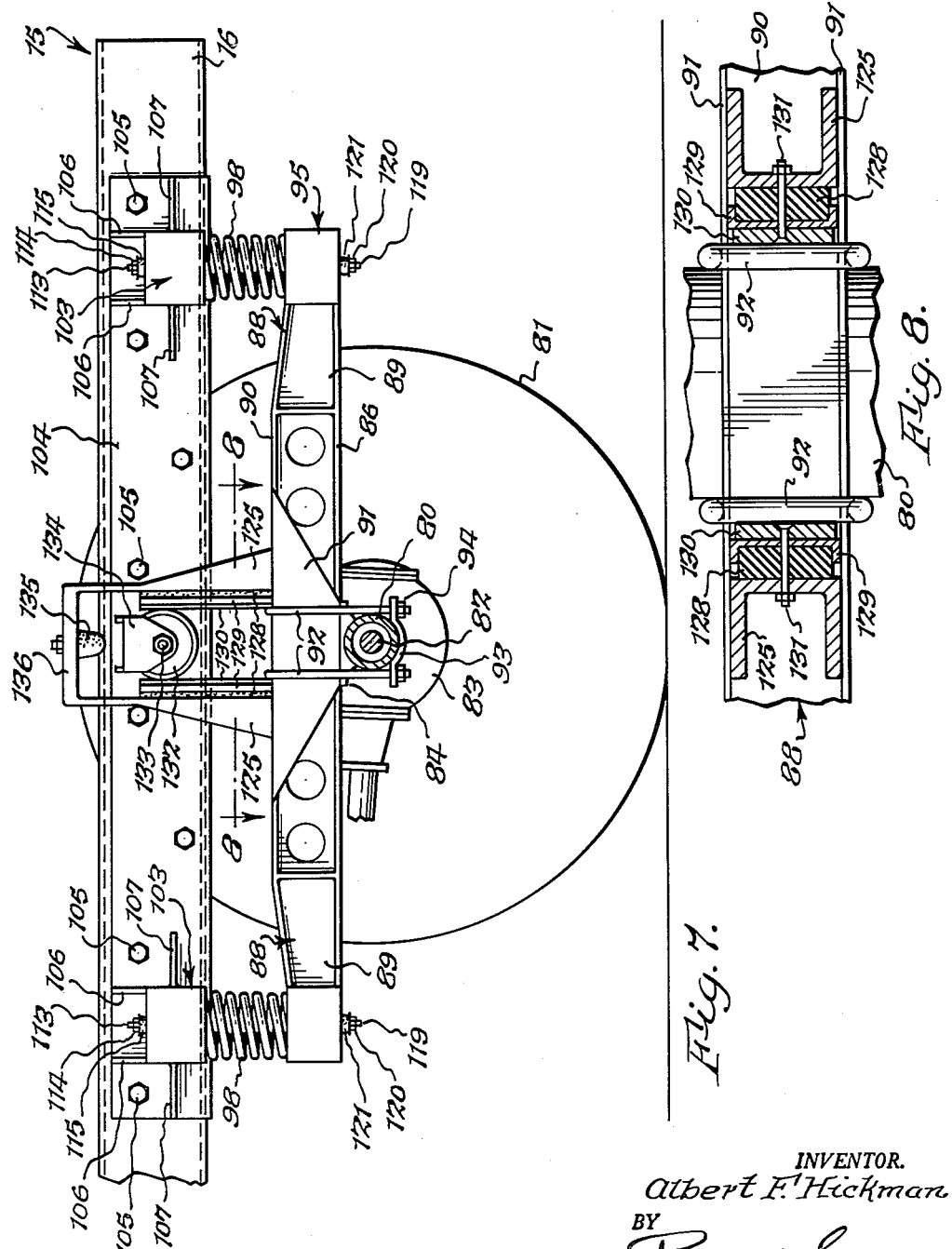
INVENTOR.
Albert F. Hickman
BY
Popp and Sommer
ATTORNEYS.

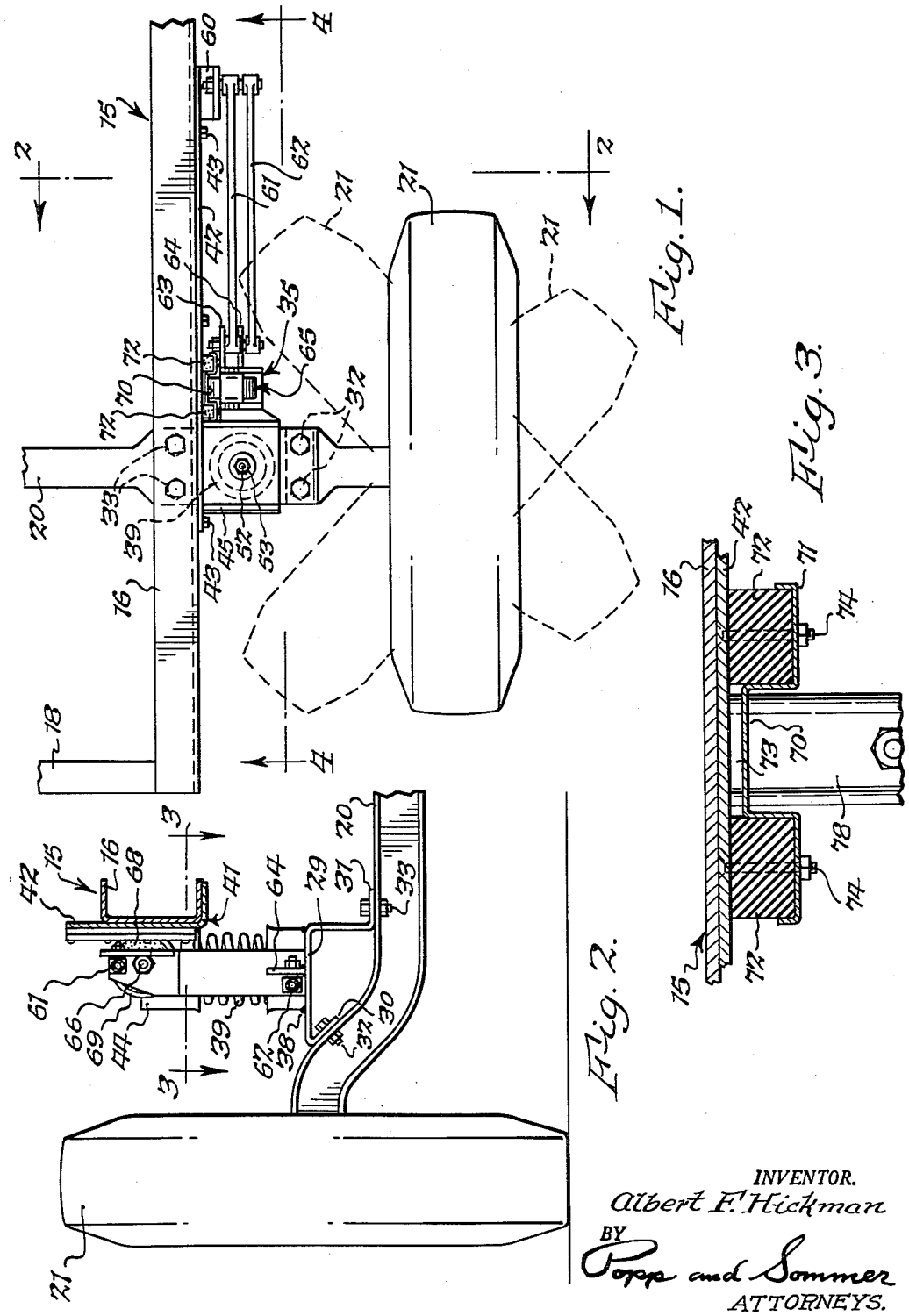

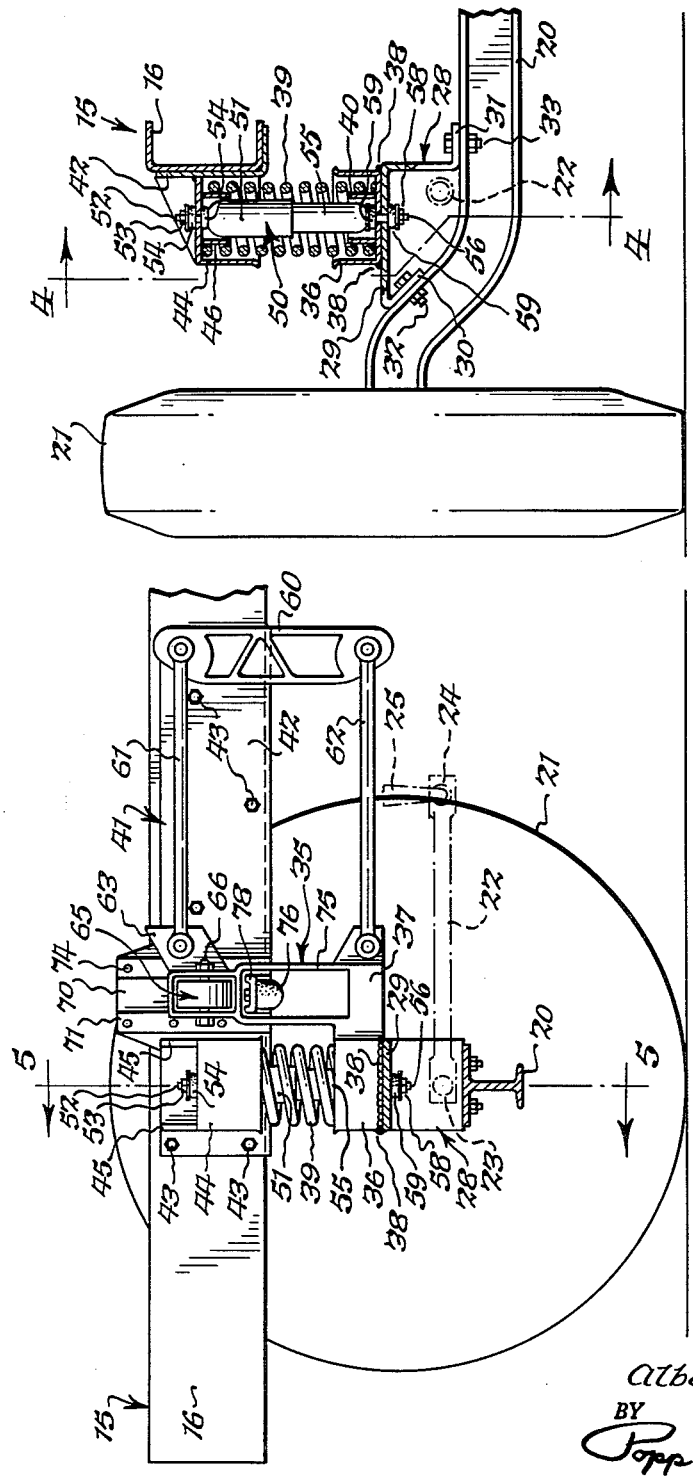

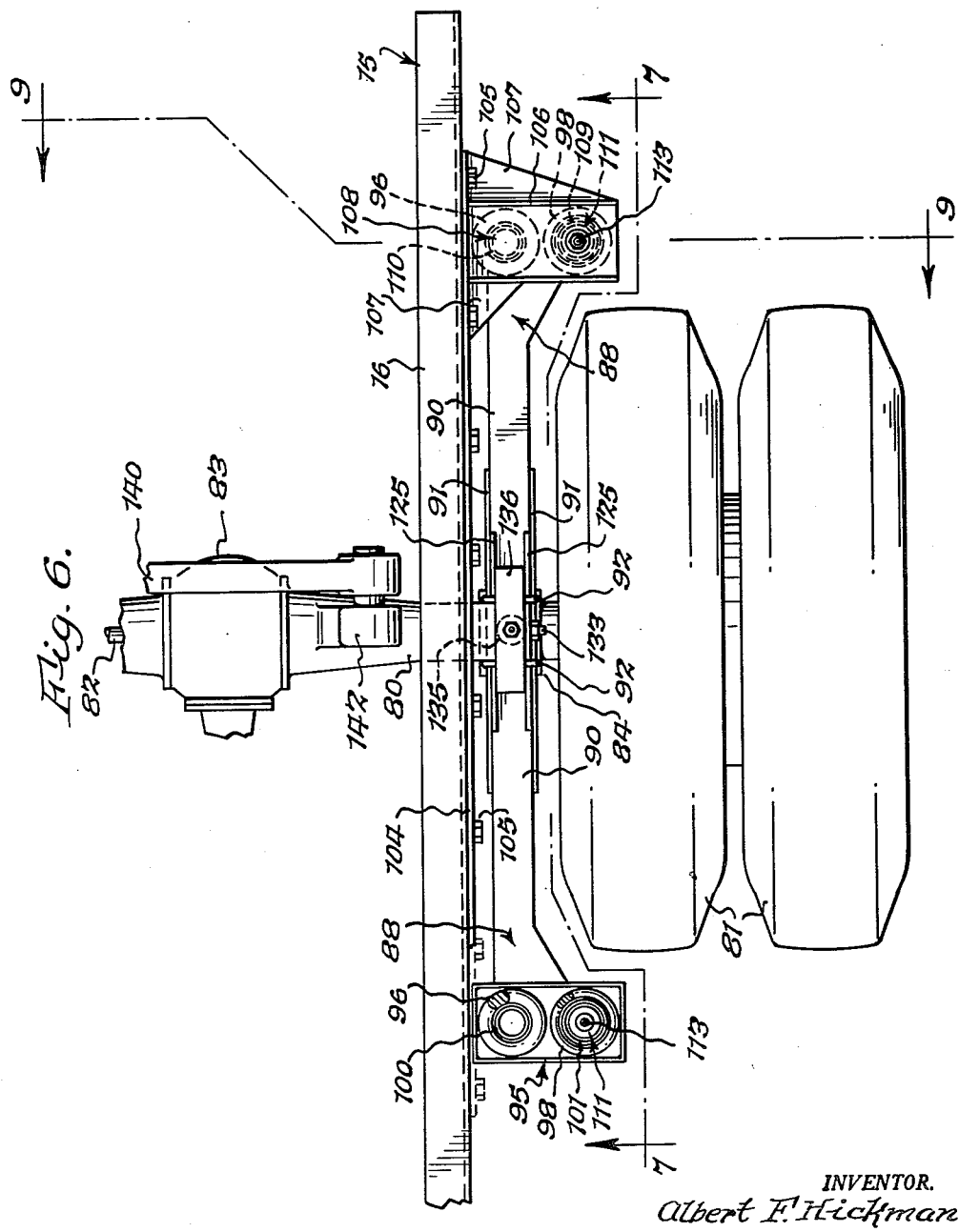

Nov. 19, 1963 A. F. HICKMAN 3,111,335
VEHICLE SPRING SUSPENSION FOR REAR DRIVE AXLE
Filed Feb. 23, 1961 5 Sheets-Sheet 5

INVENTOR.
Albert F. Hickman
BY
Popp and Sommer
ATTORNEYS.

United States Patent Office 3,111,335
Patented Nov. 19, 1963

3,111,335
VEHICLE SPRING SUSPENSION FOR REAR DRIVE AXLE
Albert F. Hickman, Eden, N.Y.
Filed Feb. 23, 1961, Ser. No. 91,102
2 Claims. (Cl. 280—124)

This invention relates to a spring suspension for vehicles in which the vertical resilience is provided by helical metal compression springs and more particularly to a single rear drive axle, although features of the invention can also be embodied in tandem axle trucks.

One of the important objects of the present invention is to provide a spring suspension in which the vertical resilience is provided by metal helical compression springs in such manner as to provide the large amount of vertical axle movement necessary with highway vehicles to provide a vertical ride as soft as load heights will allow and at a low frequency both when empty and under full load.

Another important object is to provide such a suspension in which the vertical resilience is provided by helical compression springs and which is free from friction but is automatically controlled by an increasing resistance to motion in proportion to the amplitude and velocity of vertical frame and wheel movement relative to each other.

Another object is to provide such a suspension in which the vertical resilience is provided by helical compression springs and in which lateral, vertical angular, and a slight amount of longitudinal axle movements, with reference to the vehicle frame, are permitted and resiliently resisted, the lateral and angular resiliency with reference to the vehicle frame being sufficient to absorb the lateral thrust of the axle, particularly resulting from one wheel moving up and down, thereby to provide increased safety, tire and gasoline mileage and stability, and the longitudinal resiliency, with reference to the frame, being sufficient to eliminate detrimental vibrations due to rigidity of the axle lengthwise of the frame. The elimination of the axle rigidity vertically, longitudinally, and angularly, with reference to the vehicle frame, is required for maximum life of the frame, suspension, axle and tires as well as for maximum stability and safety and maximum economies in power as well as preservation of the cargo.

Another object is to provide such a suspension in which the vertical resiliency is provided by helical compression springs and in which the resistance to lateral or angular axle movement, with reference to the frame, is automatically controlled by an increasing resistance to motion in proportion to the amplitude and velocity of movement of the axles with reference to the frame.

Another object is to provide such a suspension in which the vertical resiliency is provided by helical compression springs and in which the requirement for lubrication is substantially eliminated.

Another object is to provide such a suspension in which the vertical resiliency is provided by helical compression springs and which will stand up without any servicing, repair or replacement for many years of service even under conditions of severe and constant use.

Another object is to provide such a suspension in which the vertical resiliency is provided by helical compression springs and in which the frame is cradled and supported at distantly spaced points so as to reduce frame stresses and increase stability.

Another object is to provide such a suspension in which the vertical resiliency is provided by helical compression springs and which is very light in weight, particularly in unsprung weight, as compared with conventional suspensions.

Another object is to provide such a suspension in which vertical resiliency is provided by helical compression springs and in which very little shock absorber control is required and in which the shock absorbers, both at the front and rear of the vehicle, can be housed within certain of the helical compression springs.

Another object is to provide such a suspension in which the vertical resiliency is provided by helical compression springs and which consists of compact units which can be arranged between each wheel and frame without interference with vertical, lateral and vertical angular axle movement of the axles with respect to the frame.

Another object is to provide a suspension in which the vertical resiliency is provided by helical compression springs and which provides a much wider spring base than that provided by conventional leaf springs.

Another object is to provide such a suspension in which the vertical resiliency is provided by helical compression springs and which can be easily taken down and replaced and which is low in cost as compared with conventional spring suspensions.

Another object is to provide such a suspension in which the vertical resiliency is provided by helical compression springs and which has a long two stage spring resistance range in both vertical and angular axle movement.

Another object is to provide a rear or driving axle spring suspension in which the vertical resiliency is provided by helical compression springs and in which a large vertical movement of the frame at a low frequency is provided with two stage springing, the frame travelling on light duty springs when travelling without a load, and heavy duty springs being cut into action when the frame is loaded.

Another object is to provide a two stage spring suspension for the rear end of the vehicle in which the vertical resiliency is provided by helical compression springs and which provides a ride which is non-destructive to the cargo when loaded and which provides the optimum ride for the vehicle frame, suspension, tires and driver when travelling empty.

Another object is to provide such a spring suspension in which the vertical resiliency is provided by helical compression springs and having high and wide effective spring centers for maximum body roll and sidesway control with the maximum vertical resiliency and optimum control of wheel hop.

Another object is to provide such a spring suspension for the rear end of the vehicle in which the vertical resiliency is provided by helical compression springs and in which the springs are spaced ahead of and behind with tires in order to provide optimum control of the torsional forces from the axle created by drive or brake torque without the necessity for torque arms or radius rods arranged longitudinally of the frame.

Another object is to provide such a suspension in which the vertical resiliency is provided by helical compression springs and in which variable rate resilient resistance is provided against lateral axle movement of the axles with reference to the vehicle frame, this being provided by rollers located above the axle ends and acting against rubber-backed plates.

Another object of the invention is to provide such a spring suspension in which the vertical resiliency is provided by helical compression springs and which is lighter by several hundred pounds, particularly in unsprung weight, than conventional leaf spring suspensions.

Other objects and advantages of the invention will be apparent from the following description and drawings in which:

FIG. 1 is a fragmentary top plan view of the front end of a vehicle frame supported on a front steering axle and steering wheels by a spring suspension embodying the present invention, the construction of the parts at the opposite side of the vehicle being the same.

FIG. 2 is a fragmentary vertical section taken generally on line 2—2, FIG. 1, and showing the empty body position of the parts.

FIG. 3 is a fragmentary enlarged horizontal sectional view through the resiliently mounted frame plate along which a roller of the spring suspension at the front of the vehicle rides, this section being taken generally on line 3—3, FIG. 2.

FIG. 4 is a fragmentary vertical section taken generally on lines 4—4, FIGS. 1 and 5 and showing the empty body position of the parts.

FIG. 5 is a vertical section taken generally on line 5—5, FIG. 4 and again showing the empty body position of the parts.

FIG. 6 is a top plan view of one side of the vehicle frame supported on the rear drive axle by a spring suspension embodying the present invention, parts being shown in section.

FIG. 7 is a fragmentary vertical section taken generally on line 7—7, FIG. 6 and again showing the empty body position of the parts.

FIG. 8 is an enlarged fragmentary horizontal section taken generally on line 8—8, FIG. 7.

Figure 9:
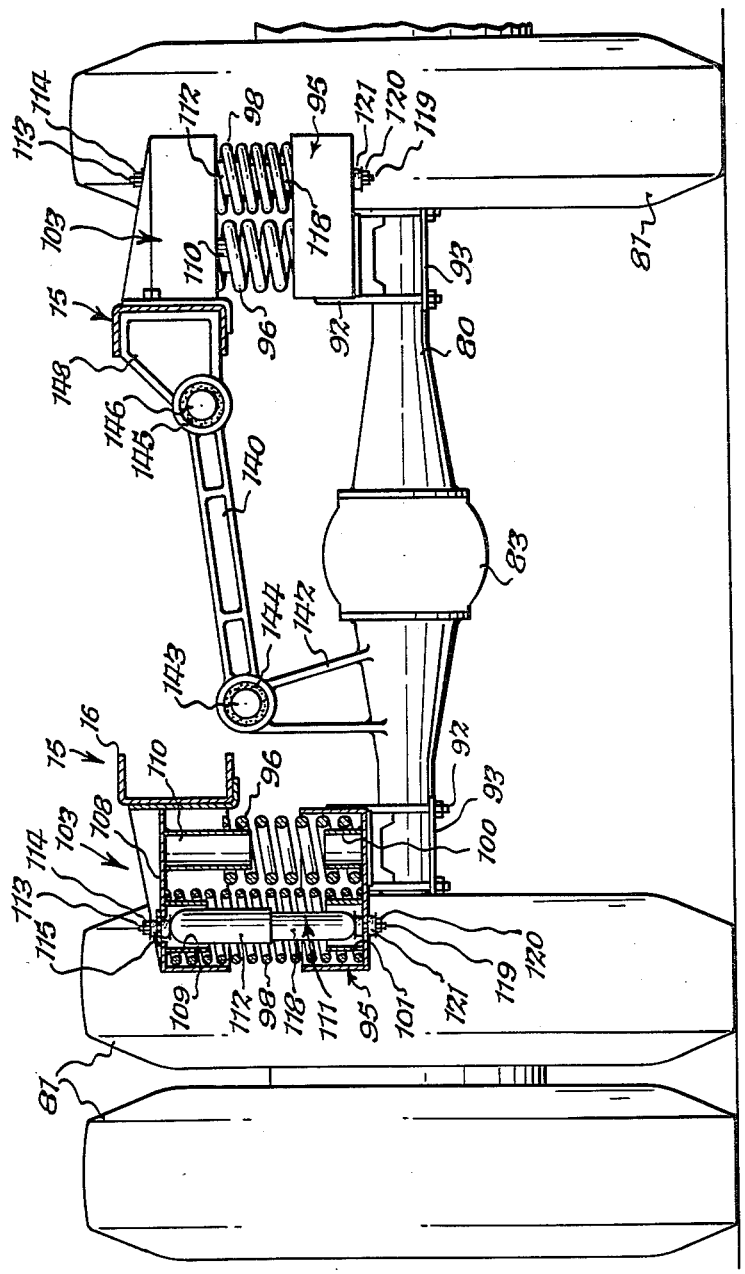
FIG. 9 is a fragmentary vertical section taken generally on line 9—9, FIG. 6 and again showing the empty body position of the parts.

The main frame 15 of the vehicle can be of any suitable construction and is shown as comprising a pair of main longitudinal side frame bars in the form of inwardly facing channels 16, which are straight and parallel and are connected by cross bars 18. The entire vehicle chassis, together with its spring suspension, is constructed substantially symetrically about a vertical longitudinal medial plane, and hence it is deemed sufficient to confine the following detailed description to the one (left) side of the vehicle, it being understood that this description and the same reference numerals apply to the other (right) side of the vehicle.

In FIGS. 1–5 is illustrated the suspension of the front end of the vehicle and which is supported on a front steering axle 20 in the form of an I-beam extending transversely of the frame 15. Each end of this axle is supported by a front rubber tired steering wheel 21 which is supported on the axle and moved by any conventional form of steering gear so as to be movable about a generally vertical axis to the two dotted line positions shown in FIG. 1 for steering the vehicle either to the right or to the left. The specific form of the steering gear is of no consequence so far as the present invention is concerned and the only part of the steering gear which is illustrated is the conventional drag link 22, the front end of which is connected by the usual ball and socket joint 23 with the usual actuating arm (not shown) of the stub shaft for the wheel, and the rear end of which steering drag link 22 is connected by the usual ball and socket joint 24 to the lower end of the usual actuating arm 25 which is pivoted on the frame 15 for fore-and-aft movement.

Mounted on each end of the axle 20 is an axle bracket 28 which is shown as being in the form of a metal strap or bar formed to provide a flat top portion 29 arranged in the space between the corresponding front steering wheel 21 and the vertical longitudinal medial plane of the corresponding main longitudinal side frame bar 16. The ends of the axle bracket 28 are formed to provide ears 30 and 31 secured by bolts 32 and 33 to the end of the axle 20.

Each of these axle brackets 28 supports a pedestal indicated generally at 35 which comprises a cup-shaped base 36 having a side extension 37, the pedestal rising from this side extension 37 of the base alongside the corresponding main longitudinal side frame bar 16 for a purpose which will presently appear. The base 36 of the pedestal 35 is welded to the axle bracket 28 as shown at 38.

A helical metal compression spring 39 is seated in the cup-shaped base 36 and is shown as held in position by an upstanding sleeve or boss 40 welded in this cup-shaped base as best shown in FIG. 5. The upper end of this helical compression spring supports a frame bracket indicated generally at 41. This frame bracket comprises a vertical attaching plate 42 secured by bolts 43 to the outer vertical face of the corresponding main longitudinal side frame bar 16 and has an inverted metal pocket 44 projecting outwardly therefrom in line with the cup-shaped base portion 36 of the pedestal 35. The inverted cup-shaped extension 44 of the frame bracket 41 is shown as reinforced by triangular webs 45 and the upper end of the helical compression spring 39 is held in centered relation by a sleeve 46 welded to the underside of the top wall of the pocket 44.

A feature of the invention resides in housing a one way shock absorber 50 within each helical compression spring 39. The shock absorber is of the telescopic type having an upper outer telescopic portion 51 with a threaded stud 52 extending through the top wall of the inverted pocket 44 and secured thereto by a nut 53, rubber washers 54 being arranged around the stud 52 on opposite sides of the top wall of the pocket 44 to permit limited lateral movement of the shock absorber without noise. The shock absorber also includes an inner telescopic portion 55 having a stud 56 extending through the bottom wall of the cup-shaped base 36 of the pedestal 35 and also the flat top 29 of the axle bracket 28. This stud is shown as secured to these last parts by a nut 58, rubber washers 59 being provided around the stud 56 on opposite sides of the bottom wall of the pedestal base 36 and also the underside of the axle bracket 28 to permit limited lateral movement of the shock absorber without noise. The one way shock absorber can be of any conventional form to resist upward or recoil movement of the frame 15 with reference to the axle 20 but to permit free downward movement of the frame 15 with reference to the axle.

The vertical plate 42 of the frame bracket 41 is extended rearwardly alongside the corresponding main longitudinal side frame bar 15 and at its rear end carries a vertical bracket 60 which projects downwardly from the main longitudinal side frame bar 16 as best shown in FIG. 4. A pair of parallel upper and lower parallelogram links 61 and 62 connect the upper and lower ends of each bracket 60 with ears 63 and 64 projecting rearwardly from the upper and lower ends of the pedestal 35, respectively. These links pivot about horizontal axes extending transversely of the line of movement of the vehicle and an important feature of the invention is that these links are substantially equal in length to the drag link 22 so as not to interfere with the steering of the vehicle.

In the upper end of the pedestal 35 is journalled a roller 65, this roller being rotatable about a horizontal pin 66 extending lengthwise of the line of movement of the vehicle. The roller can be of any suitable form but is shown as comprising a rubber body 68 vulcanized to a metal rim riding in a vertical guideway or offset central portion 70 of a metal plate 71 backed by a pair of vertical rubber blocks 72 which are arranged on opposite sides of the vertical guideway or offset central portion 70 and are sandwiched between the plate 71 and the vertical attaching plate 42 of the frame bracket 41. The vertical guideway or offset central portion 70 of the plate 71 is in spaced relation to the vertical attaching plate 42 of the frame bracket 41, as indicated at 73, so that the plate 71 is resiliently supported for horizontal movement toward and from its main longitudinal side frame bar 16, and the plate 71 and rubber blocks 72 are shown as secured to the vertical attaching plate 42 of its frame bracket 41 by bolts 74.

The pedestal 35 has a vertical opening 75 extending therethrough transversley of the line of movement of the truck and housing a depending rubber bottoming bumper 76 fixed to the underside of a bracket 78 in turn fixed to the rubber mounted frame plate 71 at the bottom of its guideway or central offset portion 70 thereof. This bumper 76 engages the base extension 37 of the pedestal 35 to provide a bottoming bumper for the front end suspension.

Referring more particularly to the suspension at the rear of the vehicle and illustrated in FIGS. 6–9, the numeral 80 represents a drive axle housing supported by rear driving wheels 81 at its opposite ends, these wheels being fast to the usual pair of rear drive axles 82 connected by the usual differential contained in a differential housing 83 forming part of the drive axle housing.

In the form of the invention shown, on each end the drive axle housing 80, externally of the corresponding main longitudinal side frame bar 16, is mounted an axle bracket 84 which can be mounted in any suitable manner and provides a horizontally disposed top plate which rigidly supports the bottom flanges 86 of a rigid horizontal beam or truss indicated generally at 88. This axle beam or truss is generally of I-beam form in cross section, having a central vertical web 89 and top flanges 90 and at its center it is reinforced by vertical triangular side plates 91 welded to the outer edges of the upper and lower flanges 86 and 90 so that at the center the truss or beam 88 is of box form in cross section. The center of the truss or beam 88 is shown as secured to the top of the axle bracket 84 by a pair of U-bolts 92, the upper cross parts of which embrace the top of the truss or beam 88 and the threaded legs of which extend through a clamping plate 93 which is drawn up against the bottom of the axle housing by nuts 94.

To each end of each truss or beam 88 is welded an upwardly opening box or pocket 95 of a size sufficient to accommodate the bottoms of a heavy duty helical compression spring 96 generally in line with the truss or beam 88, and a light duty helical compression spring 98 arranged on the side of the heavy duty spring 96 remote from the frame 15. For the purpose of supporting the light duty spring 98, each end box 95 extends laterally outwardly from the end of the truss or beam 88 and through the plane of the inside side wall of the inner tire 81 as best shown in FIG. 9. This places the light duty helical compression springs in line with the rear tires of the vehicle so as to provide wide as well as high spring suspension centers for the rear end of the vehicle.

The lower ends of the helical compression springs 96 and 98 are centered by upstanding sleeves or bosses 100 and 101, respectively, welded to the bottoms of the pockets or boxes, and the upper end of each light duty helical compression spring 98 is in constant supporting contact with a frame bracket indicated generally at 103. The pair of frame brackets or inverted pockets 103 at each side of the vehicle frame are carried at the opposite ends of a side plate 104 secured by bolts 105 to the outside vertical face of the corresponding main longitudinal frame side beam 16 and this side plate 104 is preferably somewhat longer and extends beyond the pockets 95 at the opposite ends of the truss or beam 88 which supports it. The pockets 103 are in the form of open bottom boxes welded to and projecting horizontally outwardly from opposite ends of the side plate 104 and reinforced by triangular ribs 106 and 107.

The light duty helical compression spring 98 is in constant supporting contact with the underside of the outboard end of the top plate 108 of each open bottom box or pocket 103 as best shown in FIG. 9 and is held in centered position by a depending sleeve or boss 109 welded to the underside of this top plate. The top of the heavy duty spring is out of contact with the top plate 108 in the unloaded position of the vehicle illustrated but is held in proper position with reference to the frame pocket or bracket 103 by a depending sleeve or boss 110 welded to the underside of the top plate 108 of the frame pocket or bracket 103.

Each light duty helical compression spring 98 surrounds a one-way shock absorber 111 of the telescopic type, this shock abosrber acting to resist upward or rebound movement of the frame 15 with reference to the rear axle 80. The outer or larger telescopic sleeve 112 of each shock absorber 111 is shown as having a threaded end stud 113 extending through the top plate 108 of the axle bracket 103 to which it is secured by a nut 114, rubber washers 115 surrounding this stud and being arranged on opposite sides of the top plate 108 so as to provide a noiseless and resilient connection between the shock absorber and the frame. Similarly the inner or smaller telescopic sleeve 118 of each shock absorber 111 is shown as having a threaded end stud 119 extending through the bottom plate of the box or pocket 95 to which it is secured by a nut 120, rubber washers 121 surrounding this stud and being arranged on opposite sides of this bottom plate so as to provide a noiseless and resilient connection between the shock absorber and the rear axle.

At its center a pair of opposing guide pedestals 125 are fixed to the center of each truss or beam 88 and have opposing spaced vertical faces 126 on opposite sides and in spaced parallel relation to the vertical plane of the axis of the rear drive axles 82. Against each of these faces 126 is arranged, in succession, a vertical rubber block 128, a vertical channel-shaped follower 129 the flanges of which embrace the rubber block 128, and a vertical wear plate 130. These parts can be secured together by the bolts 131 shown and the wear plate 130 are in slightly spaced relation to a roller 132.

The horizontal pivot pin 133 of this roller is parallel with the rear axles 82 and is carried by a bracket 134 fixed to the side plate 104 carrying the frame brackets 103. The top of this bracket 134 forms a stop to engage a rubber bumper 135 which forms a bottoming stop for the rear suspension. This rubber bottoming bumper is fixed to the underside of a yoke 136 the depending arms of which form upward continuations of the upstanding guide pedestals 125.

The coil springs 96 and 98 do not materially restrict movement of the axle housing 80 and wheels 81 transversely of the vehicle. To provide a cushioned resistance to such movement a radius rod 140 is arranged above and parallel with the axle housing 80. This radius rod is pivotally secured to the upper end of an upstanding bracket 142 fixed to and rising from one end of the axle housing 80. This pivotal connection is through a horizontal pivot pin 143 extending fore-and-aft of the vehicle and surrounded by a rubber bushing 144 which is embraced by the knuckle of the radius rod 140. The opposite end of this radius rod is secured through a rubber bushing 145 and pivot pin 146 with a bracket 148 suitably secured to one of the main longitudinal side frame bars 16. The horizontal force transmitted by the radius rod is cushioned by the rubber bushings 144 and 145.

*Operation*

In the operation of the suspension at the front end of the vehicle, illustrated in FIGS. 1–5, the upward movement of one end of the axle 20, through the axle bracket 28 and base 36 of the pedestal 35 compresses the helical compression spring 40. This upward force impressed upon this helical compression spring 40 is transmitted through the frame bracket 41 and its vertical attachment plate 42 to the corresponding main longitudinal side frame bar 16. It will be seen that the helical compression spring 40 can be selected to provide a vertical ride as soft as load heights will allow and at a low spring frequency at the front end of the vehicle.

During this assumed upward movement of one end of the axle 20 the telescopic shock absorber 50 is compressed. This shock absorber, however, offers no substantial resistance to this upward movement of the axle, being a one way shock absorber which offers resistance only to the downward or rebound movement of the axle and with reference to the vehicle frame.

In this vertical upward movement of one end of the axle 20 the axle end is guided to move in a substantially vertical plane parallel with its axis by the adjacent pair of radius rods 61 and 62 which are of equal length and in parallelogram arrangement with pivotal connections at the upper and lower ends of the pedestal 35 so as to insure movement of the axle end in a substantially vertical plane extending transversely of the frame, except for the slight arcing of these radius rods. Since the drag link 22 of the steering gear is substantially equal in length to these radius rods 61, 62, this vertical movement of the axle end does not interfere with steering of the vehicle nor does this vertical movement of the axle result in any self-steering of the vehicle.

During this vertical movement of the axle end the roller 65 rides along the guideway or offset central portion 73 of the side plate 71 on the frame 15 of the vehicle. Since these rollers are provided at opposite sides of the vehicle, these rollers restrain the steering axle 20 against lateral movement with reference to the vehicle frame. This restraint is, however, resilient to provide lateral cushioning. Such resilience is shown as provided both by the rubber bodies 68 of these rollers and also by the rubber blocks 72 behind the side plates 71 along which the rollers ride. The rubber used in these parts is selected to provide the required lateral cushioning of the front steering axle 20 with reference to the vehicle frame.

Bottoming of either end of the front or steering axle 20 causes engagement between the bottoming bumper 76 and the lateral extension 38 of the base of the pedestal 35. It will be noted that this bottoming force is transmitted through the rubber bodies 72 behind the side plate 71 which carries the bottoming bumper 76.

The return or rebound downward movement of the axle is provided by the helical compression spring 40. However, the shock absorber 50 is effective against this rebound movement and serves to retard the rebound action of the spring against the end of the steering axle. However a relatively small retarding effect by the one way shock absorber 50 is required so that a small telescopic type of hydraulic shock absorber can be employed and, as shown, housed within each of the helical compression springs 40.

With reference to the front end suspension, the following points will be noted:

The parallelogram links 61, 62 being the same length as the drag length 22, insures proper steering geometry and at the same time holds the steering axle properly positioned lengthwise of the frame during its vertical movement.

To provide adequate support for the load, the spring frequency at the front of the truck is desirably on the high side of the human comfort ride. By the use of friction free helical compression springs 39 in combination with the single acting shock absorbers 50 which dampen the recoil action of these springs, a very acceptable ride is provided both for the cargo and also for the passenger.

The wide effective spring centers provided by these helical compression springs 39 prevent wheel tramp and control wheel hop, control of the latter being in proportion to the square of the spacing of these springs from each other laterally of the vehicle. The use of the coil springs 39 as shown permits the springs to be arranged outside of the vehicle frame without interference with steering of the vehicle as will be apparent from an inspection of FIG. 1. The wide spacing of the helical compression springs 39 also controls body roll and sidesway, this also being in proportion to the square of the spacing of the spring centers laterally of the vehicle.

The rollers 65 also control sidesway of the vehicle as well as controlling movement of the front axle laterally of the vehicle, this control of sidesway being due to both the high and wide spacing of these rollers. These rollers supplant the transverse radius rods usually used for such lateral control. However such radius rods would be undesirable with the front end suspension as shown because they would have to be at least two feet long to permit seven or eight inches of vertical axle travel without producing excessive movement of the axle laterally of the vehicle due to arcing, and the only space available for such long radius rods would be below the engine where they would reduce road clearance. Accordingly the use of widely spaced rollers 65 located at the elevation shown is an important feature of the front end spring suspension. It will also be noted that the rubber at the front end of the suspension permits the necessary angular movement of the front axle, that is, permits one wheel to rise independently of the companion wheel. This is, of course, essential.

Maximum tire and fuel mileage is also the product of unimpaired steering geometry, absence of wheel hop and track change and the cushioning of the front axle against vertical, lateral, angular, and longitudinal movements with reference to the vehicle frame.

Coil springs are inexpensive, light in weight, friction free and have proved to have been dependable, and the entire front end suspension is low in weight and light in cost as compared with leaf springs or independent wheel suspensions. The front end suspension is also free from service difficulties, it being possible to provide rubber bushings at the pivots and all of the radius rods and it being possible to provide bearings for the rollers which can be lubricated for the life of the vehicle.

In the operation of the suspension at the rear end of the vehicle, assuming the vehicle body to be empty or lightly laden and hence the rear end of the vehicle supported on the relatively light helical compression springs 98 only as illustrated in FIG. 9, an upward movement of one end of the drive axle housing 80, through the truss or beam 88 fixed to this axle housing, compresses these relatively light helical compression springs 98 so as to impress an upward force against the axle brackets 103 at the opposite ends of the side plate 104 fixed to the vehicle frame. Accordingly, when the vehicle body is travelling empty, soft vertical resiliency at low frequency is provided by the light duty helical compression springs 98 so that the optimum ride is provided for the body, driver and spring suspension as well as any light load.

It will be noted that when travelling empty or lightly laden the body is supported by the very widely spaced light duty springs 98 so as to provide maximum sidesway or body roll control for the body, these springs being in line with the tires of the wheels 81. It will be also noted that because of this outboard arrangement of these light duty springs 88 in line with the tires and also because of the wide spacing of these springs fore-and-aft of the vehicle at the outboard ends of the truss or beam at each side of the vehicle, brake and drive torque reactions of the drive axle 80 are adequately resisted.

When the body is loaded, the frame 15 is depressed to the point where it is supported both on the heavy duty springs 96 as well as on the light duty springs 98. These heavy duty springs 96 thereby add the necessary stiffer resilient resistance to support the load and because of their high and wide positions with reference to the vehicle frame provide, in combination with the lighter springs 98, a high degree of control against body roll or sidesway of the frame even with top heavy loads.

By reason of the length of each truss or beam 88, and hence the spacing of the nests of springs 96, 98 at the ends thereof, adequate resistance is provided against brake and drive torque reactions. However the helical compression springs 96, 98 do not provide adequate resistance to horizontal movement of the axle housing 80 longitudinally of the frame. The rollers 132 and rubber cushioned plates 130 provides the required resilient resistance to such axle movement longitudinally of the frame. Thus such longitudinal axle movement with reference to the frame is transmitted through the corresponding upstanding guide bracket 125, rubber block 128 and wear plate 130 to the corresponding side of the roller 132. This roller is journalled on the frame bracket 134 and hence prevents such movement of the axle longitudinally with reference to the frame beyond the limited amount permitted by the rubber blocks 128. The degree of resiliency of these rubber blocks is selected to provide a very limited and adequately cushioned movement of the axle longitudinally of the frame. At the same time the rollers 132 do not impede vertical axle movement with reference to the frame.

With reference to the rear end suspension the following points will be noted:

The main helical compression springs 96, 98 providing the vertical resiliency are friction free, particularly as to friction of rest. As to friction of rest, which is much greater than friction of motion, with springs such as leaf springs there is no resiliency provided until the shock is heavy enough to overcome the friction of rest. When this occurs the ensuing friction of motion is insufficient to control properly the axle movement. With friction free springs, particularly as to friction of rest, the springs will absorb the smaller vibrations and when the shocks increase due to rougher roads or the like, the spring resistance increases with increased axle movement.

The helical compression springs also do not provide adequate resistance to horizontal movement of the axle housing 80 laterally of the frame. To limit and also cushion such axle movement, the rubber bushed radius rod 140 is provided. As will be seen from FIG. 9, this radius rod prevents such lateral axle movement with reference to the frame except to the limited extent provided by the rubber bushings 144 and 146 of the journals at its opposite ends. These rubber bushings yield to provide the desired degree of lateral cushioning to such axle movement.

The two stage springs 96 and 98 in combination with the light one way action shock absorber control is also important. Thus when travelling very lightly laden, the static support for the frame can be the light duty or first stage springs 98. However when travelling along a rough roadway, the body and light load is subjected to a high rate of downward deceleration each time the stiffer second stage springs 96 are encountered even though the action of these springs is cushioned and friction free and hence not like a hammer blow. The rebound action of these heavy duty springs 96 could return the body upwardly at such rate as to throw the light cargo off the floor, with resultant damage, and this is prevented by the single acting shock absorbers 111 which can be very light duty for this limited service. By the use of friction free helical compression springs as shown, there is no tendency for the downward movement of the body to exceed the gravitational rate as would be the case if these springs could pull the frame down from under the cargo so as to cause the cargo to be bounced around. Accordingly, shock absorber control for downward movement of the body (or upward movement of the axle) is not required and light duty single acting shock absorbers can be provided for the limited service of controlling recoil of the heavy duty springs 96.

It will also be noted that the light duty springs 98 are further outboard from the center of the vehicle than the heavy duty springs 96 and are in line with the rubber tired wheels 81 and not the centerlines of the trusses 88, whereas the heavy duty springs 96 are in line with these trusses or beams. For this outboard positioning, the trusses or beams 88 must be designed to sustain the torsional forces imposed by this off center loading of the light duty springs 98 but by reason of this wide spacing these light duty springs provide a very high degree of sidesway or body roll stability when travelling empty or lightly laden. Also under load, the effective spacing of the spring centers at opposite sides of the vehicle is between the heavy and light duty springs of each pair, being the average of the effect of these pairs of springs. This spacing of the effective spring centers is several inches wider than is possible with leaf or other springs located wholly between the tires and the frame.

It will also be noted that these trusses or beams 88 are long, this being not only to clear the tires but also to control brake and drive torque reactions without the use of torque arms. Such control of brake and drive torque reactions by the main springs is, of course, resilient and avoid added equipment for this purpose.

The rollers 132 perform a number of functions. By reason of the rubber mountings 128 for the plates 130 between which they ride, these rollers hold the rear axle in position longitudinally of the frame with a degree of variable rate resiliency, and by the provision of a slight clearance for the rollers between these plates 130, friction is avoided, these rollers engaging only one plate 130 at a time. The longitudinal frame vibration, absorbed by these rubber blocks 128 have become a serious problem with truck speeds rising to the 50 to 70 mile per hour range. Such vibrations are caused from eccentric tires, wheel hop and road undulations. The tires become heavy flywheels which are compelled to speed up and slow down instantly to accommodate the change in distance the wheel must travel due to road or tire irregularities. A very slight amount of longitudinal resiliency, as by the rubber blocks 128, provides time for the wheel to speed up and slow down without hopping or shaking the frame longitudinally. The effects of such longitudinal cushioning have been found remarkably effective, frame vibrations from this source having been cancelled out completely. Such vibrations can be cancelled out by rubber bushed radius rods as shown in my copending application Serial No. 25,445, filed April 28, 1960, now Patent No. 3,069,184 for Spring Suspension for Tandem Vehicles, but the rollers 132 are lighter and besides contribute to sidesway control. Furthermore since the rollers 132 are directly and well above the axle center, any horizontal force from the frame in a fore-and-aft direction causes the axle and its truss 88 to rotate and compress the corresponding pair of main helical compression springs. By this arrangement not only are the main springs used to cushion movement of the axle longitudinally of the frame, but this cushioning is on the form of a variable rate resistance because the roller 132 is located at an elevation above the axle and hence at one end of a lever arm which shortens as the body settles under load. Further when this happens the main springs 96 and 98 become stiffer and offer more resistance.

Due to the fact that the spaced outstanding guide brackets 125 are rigid with the axle, the axle is in effect made into a yoke compelling both ends of the axle to move in unison fore-and-aft of the vehicle frame. As a result forces against the axle longitudinally of the frame are cushioned without detrimental vehicle steering.

The rollers 132 are desirable journalled in bearings (not shown) that are lubricated for the life of the vehicle.

Because control of sidesway is in proportion to the height of the pivots controlling lateral movement, the pivot 143 for the radius rod 140, FIG. 9, is at the top of a high bracket rising from the axle and its other end is pivoted inside on the main longitudinal side frame bars 16. This high lateral control pivot 143 along with the wide spring centers provides a very soft ride for a truck with heavy top loads without sacrifice of stability.

As to reduction in weight, coil springs weigh only a small fraction of leaf springs and are friction free and the trusses have been designed in box and I-beam cross section for the required vertical and torsional strength.

The overall result is that the rear end suspension show is several hundred pounds lighter than a comparable leaf spring suspension with the required torque arms and radius rods. As compared with rubber suspensions or air suspensions the present suspension is as light in weight and much less costly.

As to maintenance, except for acident and replacement of the inexpensive shock absorbers at 100,000 mile intervals, the rear end suspension should be maintenance free.

It will therefore be seen that the present invention provides a rear end suspension for a highway truck which achieves the objectives and has the advantages set forth.

I claim:

1. A vehicle spring suspension adapted to be interposed between a vehicle frame and an axle having rubber tired wheels journalled at opposite ends thereof, comprising a horizontal truss fixed to each end of said axle below the space between the corresponding wheel and said frame and extending transversely of said axle beyond the circumference of said corresponding wheel, a first vertical helical compression spring seated on and rising from each end of each truss beyond the circumference of the corresponding wheel and in line with said space between the corresponding wheel and said frame, transverse extensions at each end of each truss projecting horizontally outwardly transversely of said truss to be in line with said corresponding wheel fore-and-aft thereof, a second vertical helical compression spring seated on and rising from each of said transverse extensions to be in line with said wheels fore-and-aft thereof, a frame bracket projecting from the exterior of said frame above and supported by each pair of said first and second springs, means restraining movement of said axle laterally with respect to said frame, and means restraining movement of said axle longitudinally with respect to said frame, each of said first helical compression springs being a heavy duty spring and each of said second helical compression springs being a light duty spring.

2. A vehicle spring suspension adapted to be interposed between a vehicle frame and an axle having rubber tired wheels journalled at opposite ends thereof, comprising a horizontal truss fixed to each end of said axle below the space between the corresponding wheel and said frame and extending transversely of said axle beyond the circumference of said corresponding wheel, a first vertical helical compression spring seated on and rising from each end of each truss beyond the circumference of the corresponding wheel and in line with said space between the corresponding wheel and said frame, transverse extensions at each end of each truss projecting horizontally outwardly transversely of said truss to be in line with said corresponding wheel fore-and-aft thereof, a second vertical helical compression spring seated on and rising from each of said transverse extensions to be in line with said wheels fore-and-aft thereof, a frame bracket projecting from the exterior of said frame above and supported by each pair of said first and second springs, means restraining movement of said axle laterally with respect to said frame, and means restraining movement of said axle longitudinally with respect to said frame, each of said first helical compression springs being substantially in non-load-supporting relation to said vehicle frame when said vehicle frame is empty.

References Cited in the file of this patent

UNITED STATES PATENTS

| | | |
|---|---|---|
| 2,026,909 | Nallinger | Jan. 7, 1936 |
| 2,074,289 | Wagner | Mar. 16, 1937 |
| 2,529,162 | Kier | Nov. 7, 1950 |
| 2,713,498 | Brown | July 19, 1955 |
| 2,801,865 | Katzung | Aug. 6, 1957 |
| 2,805,868 | Madden | Sept. 10, 1957 |
| 2,902,291 | Walker | Sept. 1, 1959 |
| 2,993,707 | Vaugoyeau | July 25, 1961 |
| 2,995,355 | Stump | Aug. 8, 1961 |